April 17, 1934.    C. E. SORENSEN    1,955,475
OVERRUNNING CLUTCH
Filed Nov. 2, 1931    2 Sheets-Sheet 1
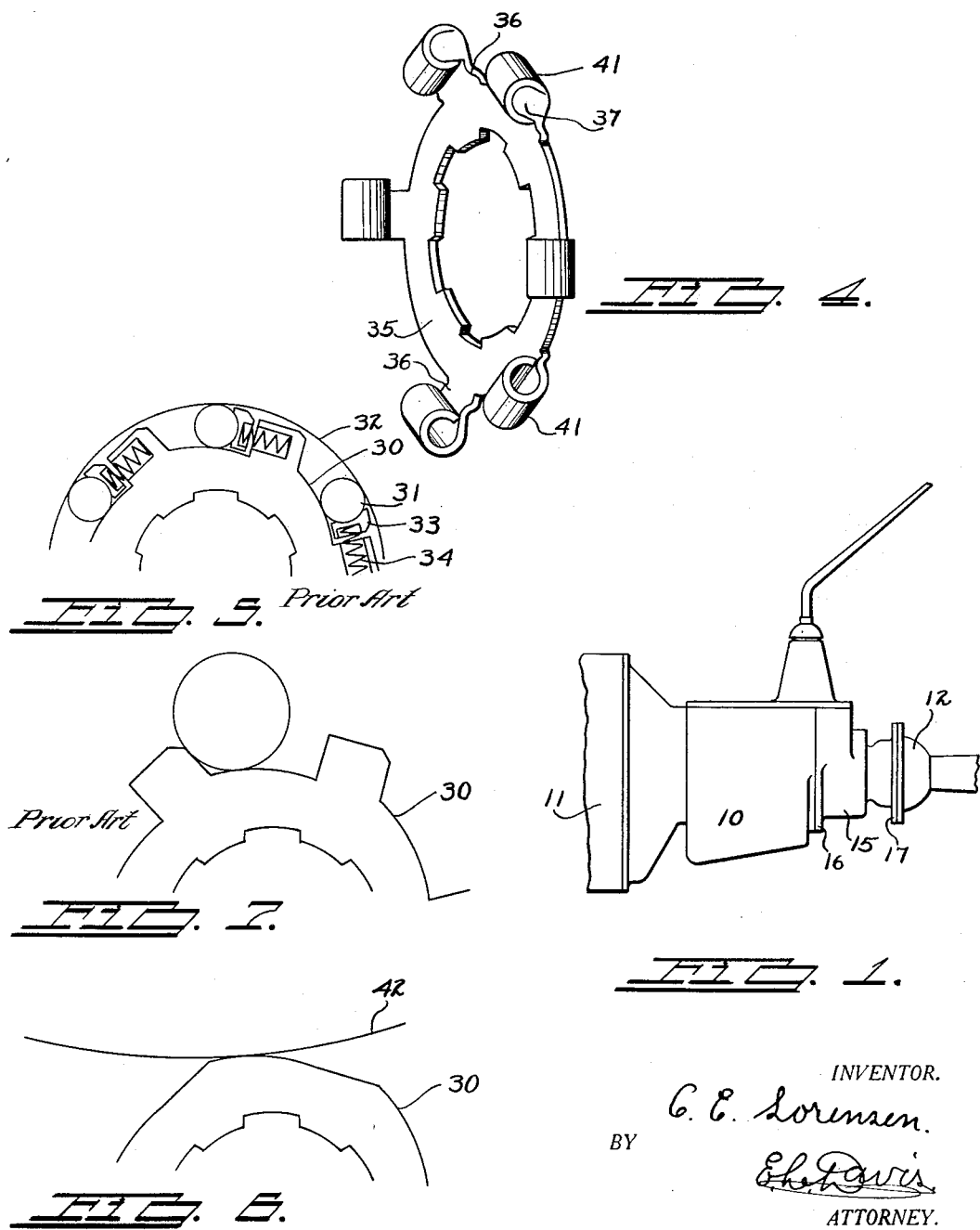
INVENTOR.
C. E. Sorensen.
BY
ATTORNEY.

April 17, 1934.  C. E. SORENSEN  1,955,475
OVERRUNNING CLUTCH
Filed Nov. 2, 1931 2 Sheets-Sheet 2
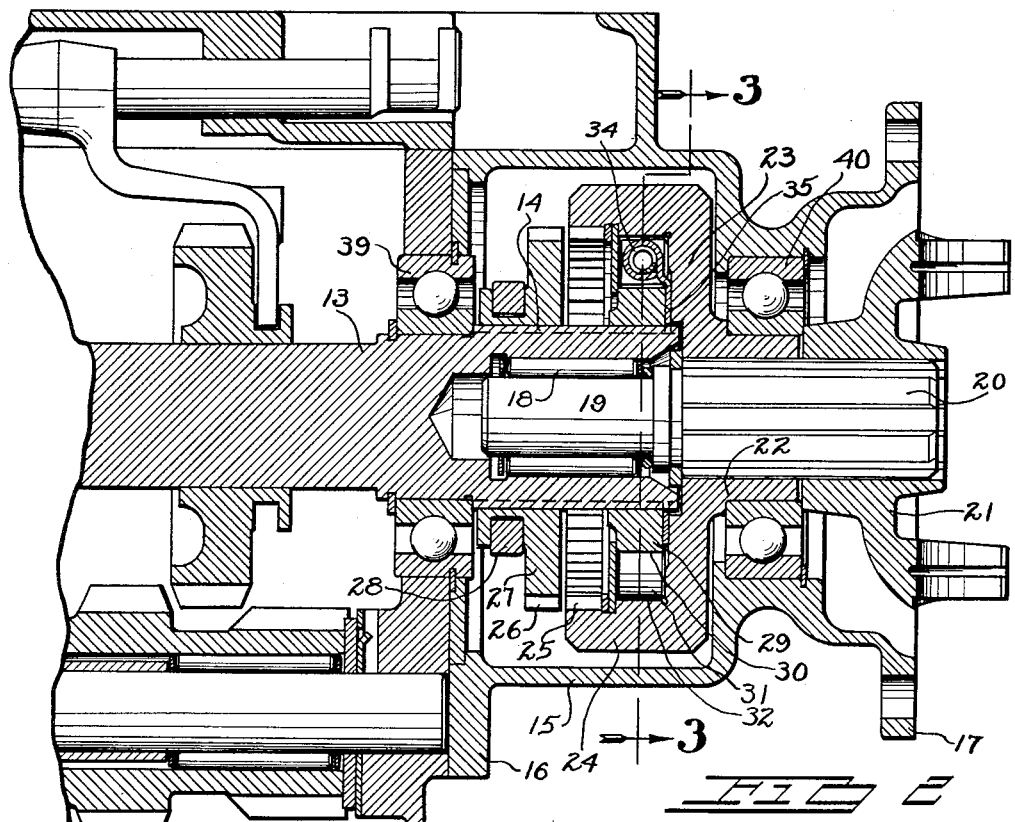
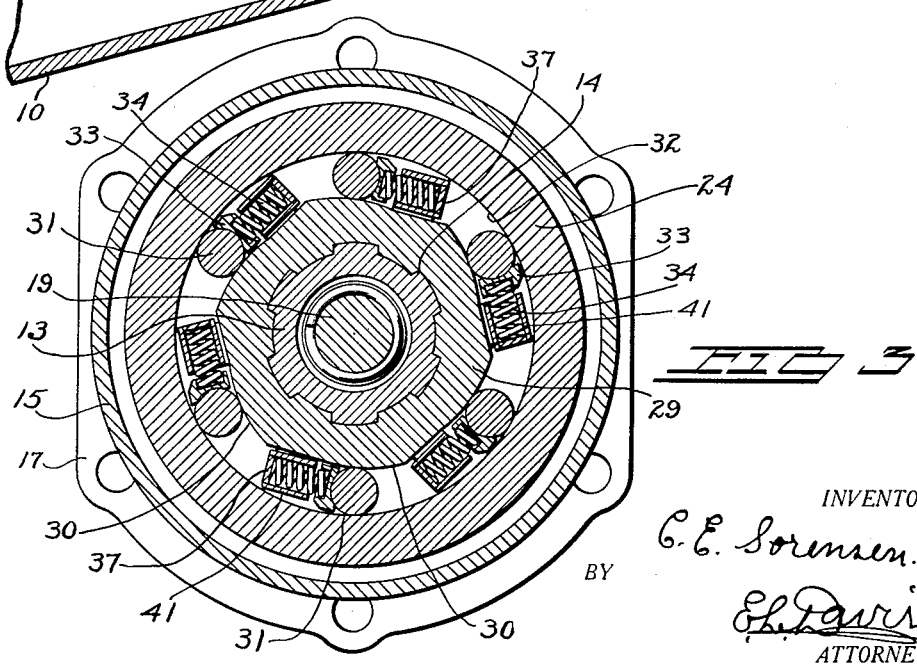
INVENTOR.
C. E. Sorensen
BY
ATTORNEY.

Patented Apr. 17, 1934

1,955,475

UNITED STATES PATENT OFFICE 1,955,475

OVERRUNNING CLUTCH

Charles E. Sorensen, Detroit, Mich., assignor to Ford Motor Company, Dearborn, Mich., a corporation of Delaware Application November 2, 1931, Serial No. 572,599

10 Claims. (Cl. 192—45)

The object of my invention is to provide a transmission especially suitable for use in automotive vehicles, which transmission has an overrunning clutch associated therewith whereby the vehicle driving wheels are selectively permitted to overrun the engine or to be positively coupled thereto, to accomplish what is ordinarily termed "freewheeling."

Still a further object of my invention is to provide a novel over-running clutch which will be exceptionally reliable in operation, and economical to manfacture. My overrunning clutch is of the roller type, there being six rollers each individually urged by means of a coil spring between individual cams and an outer driving ring. A feature of great importance in connection with this device is that I provide a spring retaining member of novel construction whereby the individual springs are held in a predetermined position relative to the cams and rollers. For this reason I am able to finish the contours of the six cams on a conventional cam-grinding machine having a large and efficient grinding wheel, whereas, if the usual structure was provided for mounting these springs the individual cam faces would need to be form ground, thereby resulting in a much more expensive operation.

With these and other objects in view, my invention consists in the arrangement, construction and combination of the various parts of my improved device, as described in the specification, claimed in my claims and illustrated in the accompanying drawings, in which:

Figure 1 shows a side view of my transmission.

Figure 2 shows a vertical central sectional view through the rear portion of the transmission, shown in Figure 1.

Figure 3 shows a sectional view, taken on the line 3—3 of Figure 2.

Figure 4 shows a perspective view of my novel roller spring retaining device.

Figure 5 shows a diagrammatic view of a conventional overrunning clutch, shown for the purpose of comparison.

Figure 6 shows a diagrammatic view of one of the cam faces incorporated in my improved clutch, illustrating how the cam faces may be ground with a large diameter grinding wheel, and Figure 7 shows a similar diagrammatic view of the conventional roller cam, illustrating the limitations encountered in grinding this cam.

Referring to the accompanying drawings, I have used the reference numeral 10 to indicate generally a transmission housing, the forward end of which is secured to a conventional clutch housing 11, while the rear end is spaced forwardly from a universal joint housing 12, my overrunning clutch housing 15 being inserted between the rear end of the transmission and the universal joint. The specific gearing in my transmission will not be described in detail as it forms no part of my invention and as any type of gearing may be used therein without affecting the operation of my overrunning clutch. It is only necessary that the transmission is provided with a driven shaft 13 projecting out through the rear wall of the transmission housing, the projecting portion of which is preferably splined at 14 whereby the drive from the transmission is conducted to my overrunning clutch.

The overrunning clutch housing 15 is provided with flanges 16 and 17 on its forward and rearward faces, respectively, through which this housing is secured between the transmission housing 10 and the universal joint housing 12. Inasmuch as the shaft 13 does not project through the housing 15, this end of the transmission shaft is provided with an annular bore therein in which a roller bearing 18 is mounted, this bearing rotatably mounting the forward end 19 of a splined shaft 20. A universal joint 21 is securely splined to the rear end of the shaft 20 while a hub 22 of my overrunning clutch ring is likewise splined to this shaft between the joint 21 and the piloted end 19. The shafts 13 and 20 are secured in permanent alignment by means of a pair of ball bearings 39 and 40 in the transmission and overrunning clutch housings, respectively. It will thus be seen that the splined portion of the shaft 20 simply serves to rigidly connect the hub 22 with the universal joint 21.

The forward end of the hub 22 is formed integrally with a radial flange 23, the outer periphery of which is formed integrally with a forwardly extending sleeve 24, which sleeve is provided with a plurality of internal clutch teeth 25 machined in its forward end adapted to selectively co-act with mating clutch teeth 26 which are formed on the periphery of a shiftable clutch member 27. The clutch member 27 is suitably splined so as to reciprocate on the splines 14 and a collar 28 is provided whereby the clutch member 27 may be operably shifted into or out of mesh with the clutch teeth 25. Thus, when the clutch member 27 is in its forward position, or that shown in Figure 2, the ring 24, splined shaft 20 and universal joint 21 may rotate independently of the transmission drive shaft 13, but when the clutch member 27 is shifted rearwardly, the shafts 13 and 20 will be positively connected for rotation in either direction.

My overrunning clutch is adapted to connect the shafts 13 and 20 for rotation in one direction and consists of the ring 24 together with a cam ring 29 which is suitably splined to the rearmost end of the splined shaft 13. This cam ring is provided with six cam faces 30 equally spaced around its periphery and six rollers 31 are placed between the respective cam faces and an annular bearing face 32 machined in the bore of the ring 24. Each of the rollers 31 is also provided with a shoe 33 against which a coil spring 34 bears, the spring and shoe resiliently urging each of the rollers upwardly on the adjacent cam face into contact with the bearing face 32. So far this construction is conventional, however, a novel feature of great importance in connection with this device is the means for anchoring the free ends of the springs 34. This means consists of a disc-like member 35 having its central portion splined to co-act with the splines 14 whereby relative rotation between the cam ring 29 and disc is prevented. Six ears 36 project radially from the periphery of this disc and are equally spaced therearound, the outer ends of these ears being curled to form short cylindrical members 41 into which each of the springs 34 extend. A tab 37 is stamped from the material of the ears 36 and is bent over so as to form a bottom for each of the members 41. It will be seen that when the device is assembled, each of the springs 34 is adequately anchored by means of the cylinders 41 and that relative movement between these anchoring devices and the cam ring 29 is prevented.

The advantage of this structure over the older type device is shown diagrammatically in Figures 5, 6, and 7, Figure 5 illustrating the conventional type structure wherein a cam ring is provided having integral ears 38 extending therefrom which are drilled to receive the anchored ends of the roller springs. It will be apparent from Figure 7 that the cam faces of such rings must be machined and ground with a form-grinding wheel, as otherwise a grinding wheel only slightly larger than the roller could be used to finish the cam surface. The use of such a small grinding wheel is a very expensive operation and where a large quantity of overrunning clutches is to be provided other means of finishing the cam is almost essential.

Referring to Figure 6, it will be seen that each of the cam faces 30 of my cam ring 29 may be progressively machined on a conventional cam grinder using an ordinary sized grinding wheel, as shown at 42. The cam ring is simply rotated at a relatively slow speed while the high speed grinding wheel is reciprocated toward and from the axis of the cam ring thereby simultaneously grinding all of the cam faces in one operation. This is a much cheaper and more satisfactory operation than either form grinding or grinding with a small wheel, as required with the conventional structure.

The cost of my spring retaining device, being a relatively simple stamping, is very much less than the savings obtained from the improved method of forming the cam ring so that a material saving in the total cost of the over-running clutch results.

A further advantage resulting from my improved device is that it may be readily assembled in an automobile free wheeling unit. All types of overrunning clutches having a plurality of springs to urge the rollers between the cam faces and the cam ring are very difficult to assemble. This is especially true where such units are used in connection with a free wheeling transmission, as the space is restricted and access to the individual rollers is not available. In assembling such a clutch it is necessary that all the rollers be simultaneously held in position on the cam faces against the urging of the springs in order that the cam ring may be installed. Where access to the rollers is prevented at the instant when the ring is to be installed it is impossible to assemble the device. The applicant has overcome this objection by making his spring retainer or anchor with a splined bore so positioned that the springs may be stressed after the rollers and cam and ring are assembled together. When the retainer is allowed to resume its free position the springs are not stressed, the cam, rollers, springs and retainer being then readily assembled in the ring 24. One ear of the retainer may then be held while the shaft is rotated through about fifteen degrees or sufficient to compress the roller springs and to align the shaft splines with the retainer splines. When the shaft is in this position it may be moved axially to rigidly secure the retainer in place. Thus, the applicant is able to assemble his overrunning clutch without the trouble of individually compressing each of his roller retainer springs which is in all cases difficult and in many cases impossible to accomplish.

A further advantage resulting from the use of my improved devices arises because my cam ring is substantially the same thickness all the way around so that the heat treating of the ring is exceptionally uniform. With the form of cam shown in Figure 7, it is much more difficult to harden the cam surfaces as the metal forming the ears being spaced around the periphery provides different rates of cooling for the cams and ears when the device is quenched, so that a uniform hardness cannot be obtained readily.

Some changes may be made in the arrangement, construction and combination of my improved device without departing from the spirit of my invention and it is my intention to cover by my claims such changes as may reasonably be included within the scope thereof.

I claim as my invention:

1. In an overrunning clutch having a spring urged wedge member therein adapted to coact with a cam member of said clutch, a splined bore in said cam member, a retainer axially aligned with said cam member having an ear extending therefrom and having a splined opening therein, a spring disposed between said ear and wedge normally urging said wedge into operative position, and a splined shaft adapted to non-rotatably reciprocate in said cam member and retainer, the splines on said members being angularly positioned so that by rotating said retainer sufficiently to stress said spring the splined shaft may be moved axially so as to lock said cam member and retainer in their operative positions.

2. A device, as claimed in claim 1, wherein the splines on said cam member and retainer are similar so that a single annulus of splines on said shaft will fit the splines on both the cam member and the retainer.

3. A device, as claimed in claim 1, wherein a plurality of wedge members are angularly spaced around said clutch and wherein said retainer is provided with a plurality of ears extending therefrom one for each wedge member.

4. A device, as claimed in claim 1, wherein the cam member of said clutch is disposed within said wedge member.

5. A device, as claimed in claim 1, wherein said spring is positioned so as to act as a compression spring.

6. In an overrunning clutch, a splined shaft, a cam ring splined to said shaft, a second ring rotatably mounted in axial alignment with said cam ring, a wedge disposed between the outer surface of the cam ring and the inner surface of the outer ring, whereby relative rotation between said rings in only one direction is permitted, a spring retainer having an ear extending therefrom to position behind said wedge, and a compression spring inserted between said ear and wedge, said retainer having splines thereon adapted to non-rotatably fit said splined shaft and having its splines positioned so that when said spring is compressed to its operative position the complementary splines on said retainer and shaft become aligned whereby said rings and retainer and wedge and spring may be assembled as a unit and then by causing relative rotation between said cam ring and retainer sufficiently to compress said spring, said spline shaft may be inserted through both the cam ring and retainer and be non-rotatably secured to each in its operative position.

7. In an overrunning clutch for effecting a drive between a pair of axially aligned spline shafts, a cam ring splined to one of said shafts, a cylindrical ring splined to the other of said shafts and disposed around said cam ring, a plurality of rollers spaced around the periphery of the cam ring and coacting with the bore in the outer ring to form a unidirectional clutch, a sheet-metal spring retainer having a plurality of ears extending radially therefrom which are bent around to form a plurality of tangential sleeves said sleeves being alternated with said rollers, and a spring disposed in each sleeve coacting against the adjacent roller to resiliently urge said adjacent roller against its cam, said retainer having a splined bore therein positioned so as to be aligned with the splines on said splined shaft to which said cam ring is secured when said retainer is angularly rotated so that the springs are compressed against their respective rollers, whereby said cam ring and retainer and rollers and springs may be assembled in said cylindrical ring and then the spline shaft inserted through the splines of both the cam ring and retainer by causing relative rotation of said cam ring in relation to said retainer.

8. In an overrunning clutch having a spring urged wedge member therein adapted to coact with a cam member of said clutch to produce a unidirectional drive, a retainer axially aligned with said cam member having an ear extending therefrom, a spring disposed between said ear and wedge normally urging said wedge into operative position, and a shaft adapted to form a connection between said cam member and retainer so as to prevent relative rotation therebetween, said shaft forming said connection only upon relative axial movement of the shaft and retainer and only when said retainer is rotated sufficiently to stress said spring into its operative position.

9. A device, as claimed in claim 8, wherein said shaft is adapted to form a driving connection for said cam member and then upon angular movement of said retainer and axial movement of said shaft to form a driving connection in said retainer.

10. In an overrunning clutch having a plurality of rollers adapted to coact with a plurality of cam faces formed on a cam member of said clutch, said member having a splined bore therein, a retainer axially aligned with said cam member having ears extending therefrom and also having a splined opening therein, springs disposed between said ears and said rollers normally urging said rollers into operative position, and a splined shaft adapted to non-rotatably reciprocate in said cam member and retainer, the splines on said members being angularly positioned so that by rotating said retainer sufficiently to stress said springs the spline shaft may be moved axially so as to lock said cam member and retainer in their operative positions.

CHAS. E. SORENSEN.